Dec. 18, 1956  W. T. ALDERSON  2,774,618
COMBINATION BALL AND SLIP JOINT FOR PIPES
Filed Sept. 13, 1954

INVENTOR.
WINSTON T. ALDERSON
BY
Knox & Knox

United States Patent Office 2,774,618
Patented Dec. 18, 1956

2,774,618
COMBINATION BALL AND SLIP JOINT FOR PIPES

Winston T. Alderson, San Diego, Calif.

Application September 13, 1954, Serial No. 455,676

4 Claims. (Cl. 285—223)

The present invention relates generally to pipe couplings and more particularly to a combination ball and slip joint for pipes.

The primary object of this invention is to provide a combination ball and slip joint suitable for pipes carrying pressurized fluid and which utilizes the internal pressure thereof to maintain an efficient seal.

Another object of this invention is to provide a combination ball and slip joint having an extremely simple ball structure mounted resiliently on one portion of pipe and slidable in a sleeve coextensive with a second section of pipe.

Another object of this invention is to provide a combination ball and slip joint which is easily assembled or disconnected without the use of tools.

Another object of this invention is to provide a combination ball and slip joint which is particularly suitable for high pressure and high temperature fluid systems.

Another object of this invention is to provide a combination ball and slip joint which is adapted for fabrication from many different materials, so that the choice of material can be according to the dictates of availability and price considerations.

Another object of this invention is to provide a combination ball and slip joint which is inexpensive and practicable to manufacture.

Finally, it is an object to provide a combination ball and slip joint of the aforementioned character which is simple, safe and convenient to use, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
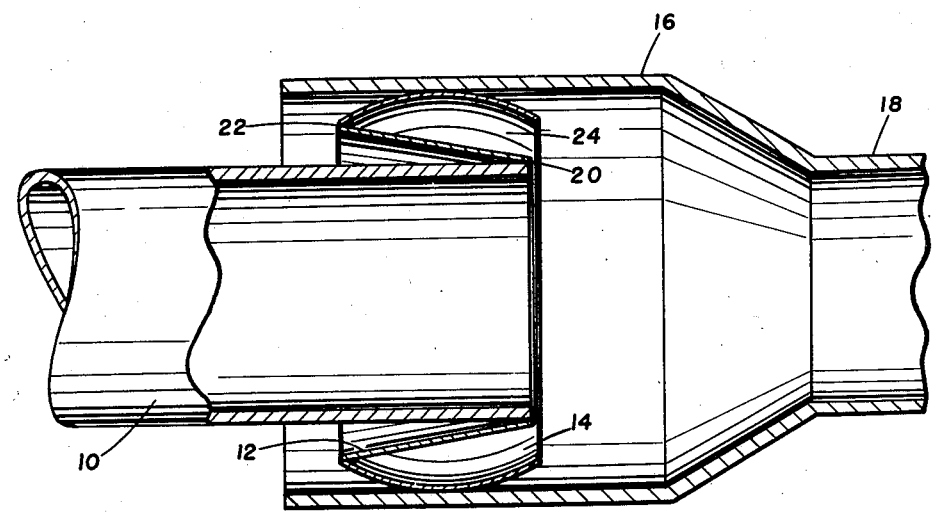
Fig. 1 is a longitudinal sectional view of the assembled joint.
Figure 2:
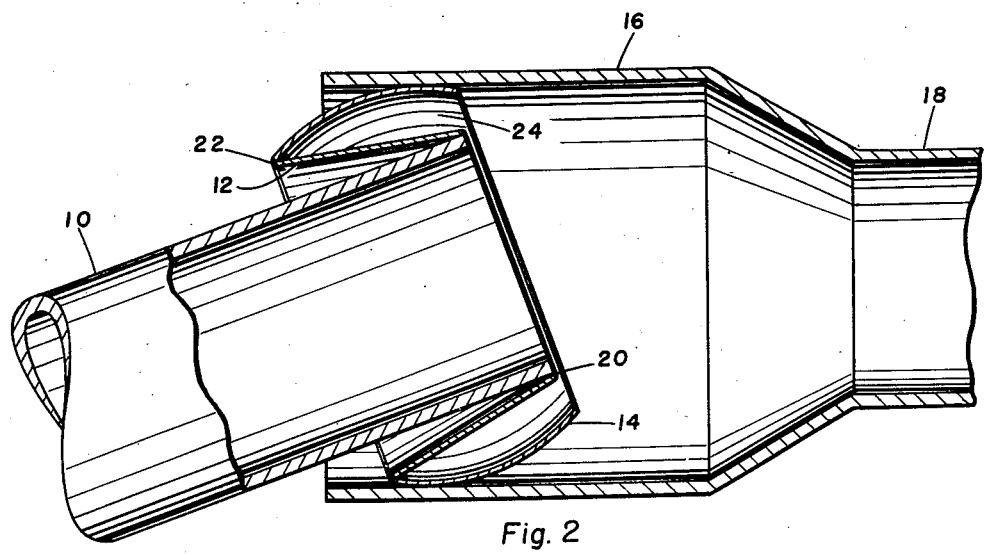
Fig. 2 is a sectional view similar to Fig. 1, but showing the slippage and pivotal displacement of the joint.

Referring now to the drawing in detail, the joint comprises a pipe 10 to which is terminally fixed a tapered resilient collar 12, the other end of said sleeve being fixed to one end of a ball sleeve 14. The ball sleeve 14 is slidable in an enlarged barrel 16 integral with a further pipe 18.

The pipes 10 and 18 and the barrel 14 are substantially rigid and are of suitable material to withstand the pressure and temperature of the fluid carried therein. The tapered collar 12 is of resilient material and is sealed at its smaller end to the end of the pipe 10 as indicated at 20 by welding or the like. The tapered collar 12 extends concentrically, in returned relation, over an end portion of the pipe 10, the larger end of said collar being annularly spaced from the pipe. The ball sleeve 14 is also of substantially resilient material and constitutes a truncated portion of a hollow sphere. This ball sleeve 14 is peripherally sealed at one end to the larger end of the tapered collar 12, as indicated at 22, by welding or the like, the other end of said ball sleeve remaining free. The ball sleeve 14 is substantially concentric with the tapered collar 12 and together therewith defines an annulus 24. In other words, the ball sleeve 14 is disposed in returned overlapping relation to the tapered collar 12, and is approximately coextensive therewith in length measured axially of the pipe 10. The diameter of the barrel 16 is such that the ball sleeve 14 is frictionally engaged with its internal surface under the normal resiliency of the sleeve structure.

When pressurized fluid is present in the system of which the illustrated joint is a part, the internal pressure present in the annulus 24 acts on the considerable area of the opposed surfaces of the tapered collar 12 and the ball sleeve 14 so that the two are forced apart. Thus the ball sleeve 14 is held firmly against the inner surface of the barrel 16 with sufficient force to prevent leakage of the pressurized fluid. While pressurized, the joint allows the pipes 10 and 18 to rotate, slide axially, or be angularly disposed relative to each other in any combination of the various movements. The axial and angular displacement are limited only by the proportional dimensions of the pipe 10 and the ball sleeve 14 together with the barrel 16.

The joint may be constructed of sheet material and requires no costly castings, forgings, or machining operations. Considerable tolerances are permissible in the structure, the seal being maintained by the combined resilience of the tapered collar 12 and ball sleeve 14, assisted by internal pressure when present.

When constructed of heat resistant material, the joint is particularly suitable for use in high capacity heating systems such as used in aircraft and is satisfactory at temperatures on the order of 700° F. and pressures on the order of 200 p. s. i. Although the material thicknesses of the tapered collar 12 and ball sleeve 14 as compared to the thickness of the pipes 10 and 18 are by no means limited, it has been found that desirable results are obtained when the thickness of the ball sleeve material is approximately one-third that of the pipe.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. A combination ball and slip joint for pipes comprising first pipe end portion and a second pipe end portion in coaxial overlapping relation to the first pipe end portion, a resilient tapered collar having its smaller end peripherally sealed to the first pipe end portion, a hollow ball sleeve defining a major portion of a sphere and peripherally sealed to the larger end of said tapered collar and extending in returned overlapping relation to said collar, said ball sleeve having continuous internal frictional engagement with said second pipe end portion during substantial angular movement of said first pipe end portion.

2. A combination ball and slip joint comprising a first pipe end portion and a second pipe end portion in coaxial overlapping relation to the first pipe end portion, a tapered collar in overlapping relation to the first pipe end portion and having the smaller end thereof circumferentially secured to the extremity of the first pipe end portion, and a hollow ball sleeve defining a major portion of a sphere and having two opposed truncated ends, one truncated end thereof being peripherally secured to the larger end of said tapered collar and extending in returned overlapping spaced relation to said collar, said ball sleeve having the other truncated end in spaced relation to said collar, said ball sleeve having continuous frictional engagement with said second pipe portion during substantial angular movement of said first pipe end portion.

3. A combination according to claim 2 wherein said collar and sleeve are substantially coextensive in length measured axially of said pipe end portions.

4. A combination according to claim 2 wherein said second pipe end portion includes an enlarged open ended cylindrical barrel, and said ball sleeve is in frictional engagement with the inner surface of said barrel.

References Cited in the file of this patent

UNITED STATES PATENTS

| | | |
|---|---|---|
| 1,042,465 | Oakes | Oct. 29, 1912 |
| 1,255,577 | Berry | Feb. 5, 1918 |
| 1,888,026 | Chapman | Nov. 15, 1932 |

FOREIGN PATENTS

| | | |
|---|---|---|
| 508,250 | France | Jan. 9, 1920 |